Aug. 13, 1957
A. H. HOVIND
2,802,663
SPRING SUSPENSION
Filed April 5, 1956
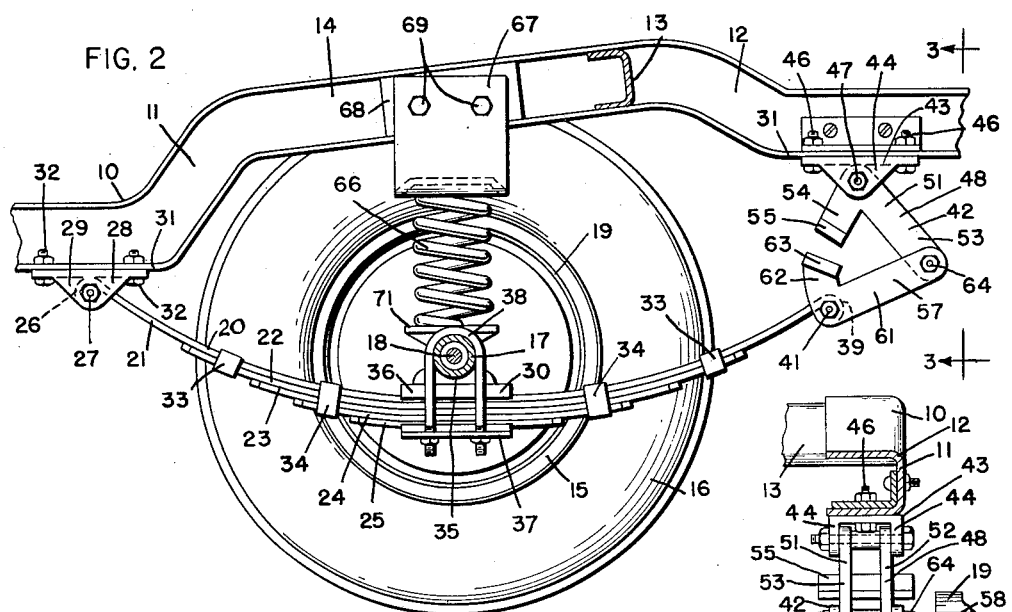
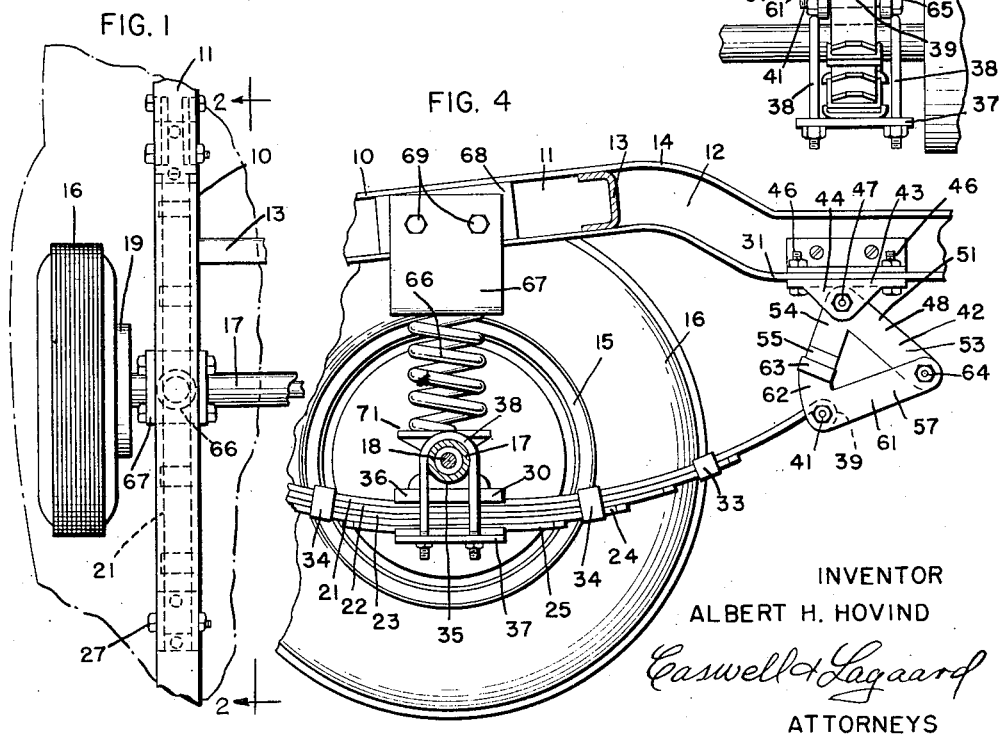
INVENTOR
ALBERT H. HOVIND
*Caswell & Lagaard*
ATTORNEYS

United States Patent Office 2,802,663
Patented Aug. 13, 1957

2,802,663

SPRING SUSPENSION

Albert H. Hovind, Eau Claire, Wis.

Application April 5, 1956, Serial No. 576,333

4 Claims. (Cl. 267—28)

The herein disclosed invention relates to spring suspensions and has for an object to provide a spring suspension in which loads of various weight may be supported and which will move the desired amount upon a designated movement of the supporting means for the suspension.

An object of the invention resides in providing a construction particularly adaptable for use with motor vehicles.

Another object of the invention resides in providing a heavy spring and a light spring, the light spring first coming into action when the load is light and the movement of the supporting means is small and the heavier spring remaining inactive during such use of the vehicle, said heavier spring coming into action when the load and movement of the supporting means is sufficiently great.

A still further object of the invention resides in providing a frame on which the load is carried and supporting means therefor and in causing both springs to at all times react against one thereof and the lighter spring to at all times react against the other thereof, the heavier spring being brought to react against the other thereof after the lighter spring has been stressed a predetermined amount.

An object of the invention when used with a motor vehicle resides in utilizing a coil spring for the lighter spring and a leaf spring for the heavier spring and in fixedly connecting both of said springs to the axle or axle housing of the vehicle.

Another object of the invention resides in fixedly connecting the coil spring to the frame of the motor vehicle, in pivotally connecting one end of the leaf spring to the frame and in providing an attachment between the other end of the leaf spring and frame causing such end of the leaf spring to move freely relative to the frame during initial movement of the coil spring and being brought into reactive engagement with the frame after the coil spring has been stressed a predetemined amount.

A still further object of the invention resides in constructing said attachment with two levers pivoted together, one being pivoted to the frame and the other to the rear end of the leaf spring, said levers being formed with stops adapted to engage each other when the frame has been depressed sufficiently to bring the leaf spring into action.

A further object of the invention resides in constructing the levers so that when the stops are in engagement the levers form a link acting between the leaf spring and frame.

Other objects of the invention reside in the novel combination and arrangement of parts and in the details of construction hereinafter illustrated and/or described.

Fig. 1 is a plan view of a portion of the chassis of a motor vehicle illustrating an embodiment of the invention applied thereto.

Fig. 2 is a fragmentary sectional-elevational view taken on line 2—2 of Fig. 1 and showing the vehicle lightly loaded.

Fig. 3 is a fragmentary elevational-sectional view taken on line 3—3 of Fig. 2.

Fig. 4 is a view similar to Fig. 2 showing the vehicle heavily loaded.

For the purpose of illustrating the invention a portion of a chassis 10 of a motor vehicle has been shown in the drawings. This chassis comprises a frame 11 having longitudinal frame members, one of which is shown and indicated by the reference numeral 12, and a rear cross frame member 13. The longitudinal frame member 12 is formed at the rearward portion of the same with an offset 14. The chassis further includes rear wheels one of which is indicated at 15 which has a tire 16 mounted on the same. Wheel 15 also has a rear axle housing 17 issuing outwardly therefrom and within which is journaled an axle 18 and by means of which the wheel is driven. The said wheel also includes a brake drum 19 which is operated in the usual manner.

The invention proper comprises two leaf springs, one of which is illustrated and indicated by the reference numeral 20. This spring consists of leaves 21, 22, 23, 24 and 25 gradually decreasing in length and underlying one another which are held in assembled relation by means of clips 33 and 34. The leaf 21 is constructed at its forward end with a loop 26 which fits over a bolt 27 passing through lugs 28 on a mounting 29. Mounting 29 is bolted to the lower flange 31 of the longitudinal frame member 12 by means of bolts 32.

The axle housing 17 is attached to the spring 20 by means of the following construction: Overlying the leaf 21 of the spring is a saddle 30 which is constructed with an arcuate recess 35 which receives said housing. This saddle is further constructed with a plate 36 overlying leaf 21. Underlying the leaf 25 is another plate 37 and two U-bolts 38 are disposed one on each side of the spring which encircle the housing 17 and pass through both of the plates 36 and 37. This construction serves to firmly hold the spring attached to the axle housing.

The rearward end of the spring 20 is connected to the frame member 12 by means of an attachment 42. This attachment consists of a mounting 43 similar to the mounting 29. This mounting is formed with spaced downwardly extending lugs 44 and is bolted to the lower flange 31 of the longitudinal frame member 12 by means of bolts 46. A bolt 47 passes through the lugs 44 and pivotally supports an inverted V-shaped lever 48 formed in two sections 51 and 52. Each of these sections consists of an arm 53 extending in a rearward direction and an arm 54 extending in a forward direction. Connected to the arms 54 of the sections 51 and 52 is a stop 55. In addition to the lever 48 another V-shaped lever 56 is employed which is similarly constructed in two sections 57 and 58. These sections each have arms 61 and 62 extending in correspondence with the arms 53 and 54 of lever 48. The arms 62 are connected together at their outermost ends and have attached to them a stop 63. The arms 53 and 61 are pivoted together by means of a pintle 64 and a sleeve 65 encircling said pintle holds the two sections in proper spaced relation. The rearward end of the leaf 21 of spring 20 is formed with a loop 39 which encircles a bolt 41 passing through the two sections 57 and 58 at the vertex between the arms 61 and 62.

Acting between the axle housing 17 and the offset 14 in frame member 12 is a compression coil spring 66. This spring is seated at its upper end in an upper spring seat 67 which is attached to said offset by means of a filler block 68 and bolts 69 which extend through said frame member and seat. The lower end of said spring is seated in a spring seat 71 which rests on the axle housing 17.

The operation of the invention is as follows: Spring 66 is a softer spring than the spring 20 but has sufficient rigidity to hold the vehicle properly supported when lightly loaded with the two stops 55 and 63 spaced from one another as shown in Fig. 2. When the vehicle is so loaded, spring 66 is partially compressed but not sufficiently to bring the stops 55 and 63 in contact with one another. As the vehicle passes over irregularities in the road spring 66 flexes and operates in the customary manner. Throughout such movements spring 20 is connected to the lever 56 which floats relative to the rearward portion of the frame 11. Such movement of the spring 66 hence brings about no flexure of the spring 20. When, however, the vehicle is further loaded, the stops 55 and 63 are brought into engagement and the rear end of the spring is now anchored with reference to the attachment 42, the levers 48 and 56 moving in unison and serving as a link for connecting the rear end of the spring to the frame. Spring 20 now comes into action and in combination with spring 66 offers greater resistance to the movement of the chassis frame relative to the wheels as the vehicle is propelled over the road. When the vehicle is lightly loaded and the wheels strike an unusually great irregularity in the road, stops 55 and 63 may be brought into engagement to cause the spring 20 to aid in resisting excessive movement between the wheels and frame.

The advantages of the invention are manifest. The spring suspension utilizes two springs thereby permitting of having different spring supports for light and heavy loads. When the vehicle is only lightly loaded, the light spring operates to absorb the shock and flexes in accordance with the load. When, however, the vehicle is heavily loaded, both springs are brought into action, and the movement of the vehicle is properly controlled. The instant invention can be designed so that any desired movement can be procured with both light and heavy loading. The suspension is simple in construction and can be fabricated at a nominal expense. Having once been installed the suspension is trouble free and will not require any appreciable attention.

Changes in the specific form of the invention, as herein described, may be made within the scope of what is claimed without departing from the spirit of the invention.

Having described the invention, what is claimed as new and desired to be protected by Letters Patent is:

1. A spring suspension for use with a vehicle having a chassis provided with a longitudinal frame member and a wheel axle housing extending transversely thereof, comprising a leaf spring attached intermediate its ends to said axle housing and pivoted at one end to said longitudinal frame member, the other end of said leaf spring being normally freely movable in an up and down direction relative to said frame member, a compression coil spring continuously acting between said frame member and axle housing, and an attachment for the other end of said leaf spring comprising two levers pivoted together, one being pivoted to said frame member and the other to the second named end of the leaf spring, said levers having stops normally spaced from one another and adapted to engage each other when the coil spring is stressed a predetermined amount, said stops at such position bringing said leaf spring into action.

2. A spring suspension for use with a vehicle having a chassis provided with a longitudinal frame member and a wheel axle housing extending transversely thereof, comprising a leaf spring attached intermediate its ends to said axle housing and pivoted at one end to said longitudinal frame member, the other end of said leaf spring being normally freely movable in an up and down direction relative to said frame member, a compression coil spring continuously acting between said frame member and axle housing, and an attachment for the other end of said leaf spring comprising an inverted V-shaped lever pivoted at its apex to said frame member and having a forward arm and a rearward arm, a V-shaped lever pivoted at its vertex to the other end of said leaf spring and having a forward arm and a rearward arm, pivot means between two of the corresponding arms of said levers and stops on the other arms normally spaced from one another and engageable with one another when the coil spring is stressed a predetermined amount, said stops at such position bringing said leaf spring into action.

3. A spring suspension for use with a vehicle having a chassis provided with a longitudinal frame member and a wheel axle housing extending transversely thereof, comprising a leaf spring attached intermediate its ends to said axle housing and pivoted at its forward end to said longitudinal frame member, the rearward end of said leaf spring being normally freely movable in an up and down direction relative to said frame member, a compression coil spring continuously acting between said frame member and axle housing, and an attachment for the rearward end of said leaf spring comprising an inverted V-shaped lever pivoted at its apex to said frame member and having a forward arm and a rearward arm, a V-shaped lever pivoted at its vertex to the rearward end of said leaf spring and having a forward arm and a rearward arm, pivot means between two of the corresponding arms of said levers and stops on the other arms normally spaced from one another and engageable with one another when the coil spring is stressed a predetermined amount, said stops at such position bringing the leaf springs into action.

4. A spring suspension for use with a vehicle having a chassis provided with a longitudinal frame member and a wheel axle housing extending transversely thereof, comprising a leaf spring attached intermediate its ends to said axle housing and pivoted at its forward end to said longitudinal frame member, the rearward end of said leaf spring being normally freely movable in an up and down direction relative to said frame member, a compression coil spring continuously acting between said frame member and axle housing, and an attachment for the rearward end of said leaf spring comprising an inverted V-shaped lever pivoted at its apex to said frame member and having a forward arm and a rearward arm, a V-shaped lever pivoted at its vertex to the rearward end of said leaf spring and having a forward arm and a rearward arm, pivot means between the two rearward arms of said levers and stops on the forward arms normally spaced from one another and engageable with one another when the coil spring is stressed a predetermined amount, said stops at such position bringing the leaf springs into action.

References Cited in the file of this patent

UNITED STATES PATENTS

| | | |
|---|---|---|
| 1,448,224 | Luce | Mar. 13, 1923 |
| 1,662,327 | Patten | Mar. 13, 1928 |
| 2,413,291 | Chapin | Dec. 31, 1946 |
| 2,431,440 | Willis | Nov. 25, 1947 |
| 2,461,874 | Bohlen | Feb. 15, 1949 |